(12) United States Patent
Beck et al.

(10) Patent No.: US 6,241,027 B1
(45) Date of Patent: Jun. 5, 2001

(54) HAND OPERATED ELECTRIC TOOL, ESPECIALLY A JIGSAW

(75) Inventors: Reimund Beck, Hünfelden; Stefan Blickhan, Darmstadt; Rainer Herting, Langenhahn; Ernst Staas, Limburg, all of (DE); David L. Sutton, Easton, MD (US)

(73) Assignee: Black & Decker Inc., Newark, DE (US)

( * ) Notice: Subject to any disclaimer, the term of this patent is extended or adjusted under 35 U.S.C. 154(b) by 26 days.

(21) Appl. No.: 09/358,639

(22) Filed: Jul. 21, 1999

(30) Foreign Application Priority Data

Jul. 21, 1998 (DE) ................................. 198 33 794

(51) Int. Cl.$^7$ .................................... B23D 49/04
(52) U.S. Cl. ................. 173/216; 173/114; 30/277.4; 30/388; 30/392
(58) Field of Search ................ 173/216, 205, 173/114, 109, 104; 30/392, 394, 388, 391, 277.4

(56) References Cited

U.S. PATENT DOCUMENTS

| 2,890,072 |   | 6/1959  | Kaman et al. . |         |
|-----------|---|---------|----------------|---------|
| 4,385,898 |   | 5/1983  | Jordan .       |         |
| 4,518,369 |   | 5/1985  | Shinsen .      |         |
| 4,661,009 |   | 4/1987  | Tripp .        |         |
| 4,902,162 |   | 2/1990  | Watt .         |         |
| 5,023,999 | * | 6/1991  | Looper et al.  | 30/390  |
| 5,127,316 |   | 7/1992  | Ishiwata et al. . |      |
| 5,392,519 |   | 2/1995  | Inoue et al. . |         |
| 5,450,925 | * | 9/1995  | Smith et al.   | 30/394  |
| 5,555,626 | * | 9/1996  | Fuchs          | 30/392  |
| 5,582,489 |   | 12/1996 | Marzio et al. . |        |
| 5,725,058 | * | 3/1998  | Eriksson       | 173/114 |
| 5,727,322 |   | 3/1998  | Giacometti .   |         |
| 5,765,652 |   | 6/1998  | Mathis et al. . |        |
| 5,873,282 | * | 2/1999  | Dibbern, Jr. et al. | 30/391 |
| 6,026,909 | * | 2/2000  | Hon            | 173/216 |
| 6,093,130 | * | 7/2000  | Buck et al.    | 173/216 |

FOREIGN PATENT DOCUMENTS

| 1913766 | 10/1970 | (DE) . |
| 7803299 | 5/1978  | (DE) . |
| 3508738 | 9/1985  | (DE) . |
| 3624386 | 1/1988  | (DE) . |
| 3643066 | 6/1988  | (DE) . |
| 4113649 | 10/1992 | (DE) . |
| 4329709 | 3/1994  | (DE) . |
| 9408089 | 10/1995 | (DE) . |
| 1024367 | 6/1983  | (SU) . |

\* cited by examiner

Primary Examiner—Scott A. Smith
(74) Attorney, Agent, or Firm—Michael P. Leary; Bruce S. Shapiro

(57) ABSTRACT

A hand-operated electric tool, especially a jigsaw, has a motor unit provided in the tool housing. The motor unit contains in a motor housing the stator and the rotor. One end of the rotor shaft projects from the motor housing and is mounted in two bearings fixed in the motor housing. A countershaft forms an extension of the rotor shaft and carries a toothed arrangement. The countershaft is coupled to the rotor shaft and is rotatably mounted in a bearing. The rotor shaft and countershaft engage axially with radial play and are coupled non-rotatably by co-operating radial projections and recesses receiving the projections. In the region of the overlapping portions of rotor shaft and countershaft, one of the shafts has an annular portion extending at least over a part of the circumference. The annular portion is substantially in line contact with an adjacent circumferential surface of the other shaft. The line contact permits misalignment of the rotor shaft and countershaft but reduces noise.

6 Claims, 6 Drawing Sheets

HAND OPERATED ELECTRIC TOOL, ESPECIALLY A JIGSAW

BACKGROUND OF THE INVENTION

The invention relates to a hand-operated electric tool, especially a jigsaw, having a motor unit provided in the tool housing, which motor unit contains in a motor housing the stator and the rotor, wherein the rotor shaft projecting with one end from the motor housing is mounted in two bearings fixed in the motor housing, having a gear train which is arranged to be driven by the rotor shaft, which gear train is coupled to the rotor shaft by way of a countershaft that forms an extension of the rotor shaft and is rotatably mounted in a bearing, and having a tool chuck which is arranged to be driven by means of the gear train.

Electric tools, especially jigsaws, in which a pre-assembled motor unit is provided for the drive, are well known. The use of the pre-assembled motor unit, which is manufactured in large piece numbers and therefore economically, has the advantage that the very compact construction of the motor unit enables it to be mounted by fixing the motor housing in the housing of the electric tool, without the rotor and stator having to mounted in separate steps and without any need for the bearings of the rotor shaft to be set in specially constructed locating regions of the housing of the electric tool. With these motor units, however, for many applications, inter alia jigsaws, it is a disadvantage that the portion of the rotor shaft projecting from the motor housing is comparatively short, so that it cannot be coupled directly to the gear train arranged at distance from the motor housing in the housing of the electric tool. On the contrary, a countershaft has to be provided, which acts as an extension of the rotor shaft and has a toothed arrangement, preferably a pinion, which meshes with the input gearwheel of the gear train.

This countershaft has to be rotatably mounted in an additional bearing, and it is normally rigidly connected to the rotor shaft. This produces, however, a three-point bearing of the unit comprising rotor shaft and countershaft, namely, on the one hand in the two bearings of the rotor shaft and on the other hand in the additional bearing of the countershaft. The bearings of such a three-point bearing cannot be coaxially aligned with absolute accuracy, however, so that in operation the rotating unit comprising rotor shaft and countershaft is subject to bending stresses. These present no problems provided that the unit comprising rotor shaft and countershaft is of comparatively stable construction and the stresses acting on this unit in the region in which it engages with the gear train are not too great. As the stresses in the engagement region with the gear train increase, however, for instance in a relatively high-performance jigsaw, in which additional impact stress is transferred, via the gear, from the reciprocating saw blade engaged with the workpiece to the unit comprising rotor shaft and countershaft, it has been found that there is a risk that the three-point mounted unit will fracture.

The invention is based on the problem of eliminating the risk of fracture arising in the known construction.

BRIEF DESCRIPTION OF INVENTION

According the present invention, a portable power tool comprises a tool housing and a motor mounted in the tool housing. The motor has a motor housing and a rotor shaft rotatably mounted in and projecting from one end of the motor housing. A gear train is connected between a chuck for a power tool accessory and the motor. A countershaft is rotatably mounted in the tool housing via a bearing and connects the rotor shaft and the gear train. The connection between the rotor shaft and the countershaft is axially overlapping, is nonrotatable and permits radial play between the shafts. The connection comprises (1) mating projections and recesses on the shafts and (2) an annular projection on one of the shafts in line contact with a circumferential surface on the other of the shafts. The projections are on a first of the shafts. The recesses on the second of the shafts mate with the projections. The annular portion extends over a portion of the circumference of one of the shafts and is in substantially line contact with the circumferential surface on the other of the shafts.

With the construction in accordance with the invention, the rotor shaft mounted in the two bearings provided in the motor housing and the countershaft mounted in an additional bearing arc uncoupled from one another as a consequence of the engagement with radial play. Thus, the inevitable misalignment of the bearings does not lead to the disadvantageous bending stresses of a three-point bearing. On the contrary, because of the inevitable misalignment of their bearing arrangements, rotor shaft and countershaft are likewise not aligned exactly coaxially with respect to one another. Locking of the rotor shaft and countershaft to prevent rotation, and hence the transfer of the rotary movement from the rotor shaft to the countershaft and from there to the gear train, is achieved by the interlocking engagement of rotor shaft and countershaft by virtue of the radial projections and the recesses receiving them.

It has been found, however, that coupling of rotor shaft and countershaft with radial play can lead to the generation of considerable noise at high speed of the rotor shaft. Therefore, the radial play of the coupling is restricted in accordance with the invention by providing, on one of the shafts, an annular portion substantially in line contact with the adjacent circumferential surface of the other shaft. The line contact engagement between annular portion and circumferential surface does not hinder possible tilting of rotor shaft and countershaft relative to one another as a consequence of misalignments of their bearing arrangements and ensures a certain contact of rotor shaft and countershaft in the overlap region of the two shafts. This has unexpectedly led to a considerable reduction in noise during joint rotation of rotor shaft and countershaft at high speed.

In a preferred practical form of the invention, two projections lying diagonally opposite one another are present, and the annular portion extends on both sides between the projections, that is, forms two diagonally opposite component portions.

The rotor shaft can extend with a bushing affixed thereto into a coaxial opening in the countershaft, and the projections and the annular portion can then be formed on the bushing.

A further source of noise in the coupling of rotor shaft and countershaft provided is located in the region between the lateral surfaces of the projections and the lateral surfaces faces or axially running walls for the recesses receiving the projections. Depending on the direction of rotation a lateral wall of a projection comes into torque-transferring engagement with a lateral wall of the associated recess, this engagement varying in operation in dependence on the loading occurring. These variations in engagement can lead to noise.

To reduce this noise generation, the recesses can have resiliently deformable supporting portions abutting the projections on both sides. Although the variation in loading in the coupling region between rotor shaft and countershaft is not reduced thereby, the resilient construction of the supporting portions "damps" these variations, so that an effective noise reduction is achieved.

Preferably, a fan wheel of plastic material has a hub containing the recesses and is supported on the countershaft. The supporting portions are plastic and are formed integral with the fan wheel.

BRIEF DESCRIPTION OF THE DRAWINGS

The invention is explained in detail in the following with reference to the Figures showing an exemplary embodiment.

DETAILED DESCRIPTION OF DRAWINGS AND EMBODIMENT

Note that the construction of the jigsaw corresponds substantially to the conventional construction of an electric tool of that kind, so that details that are not essential to the invention are not explained more specifically. The customary gear train for such jigsaws is not, incidentally, shown in the Figures, and the part of this gear train at the front in the saw housing is indicated in FIG. 3 merely as a hatched area.

Figure 1:
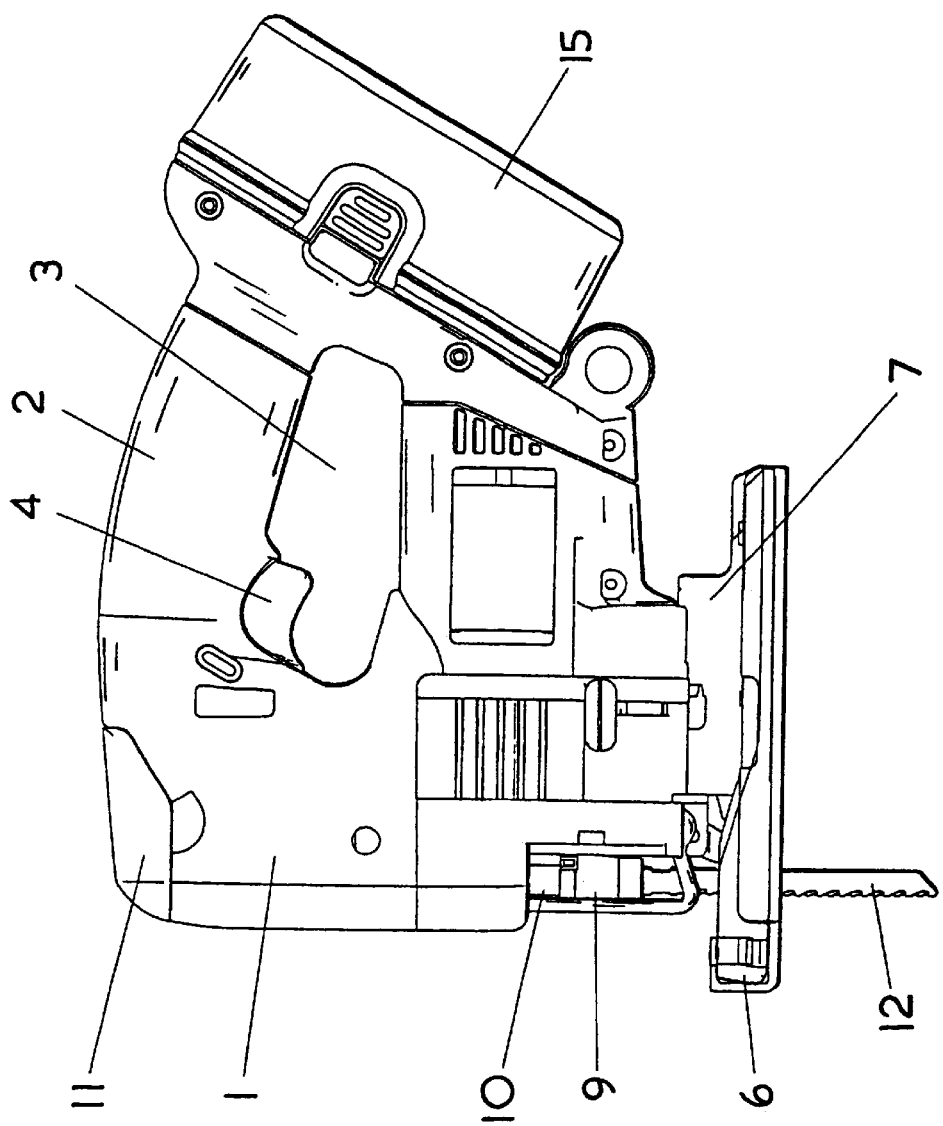
FIG. 1 is a diagrammatic side view of a battery-powered jigsaw.
Figure 2:
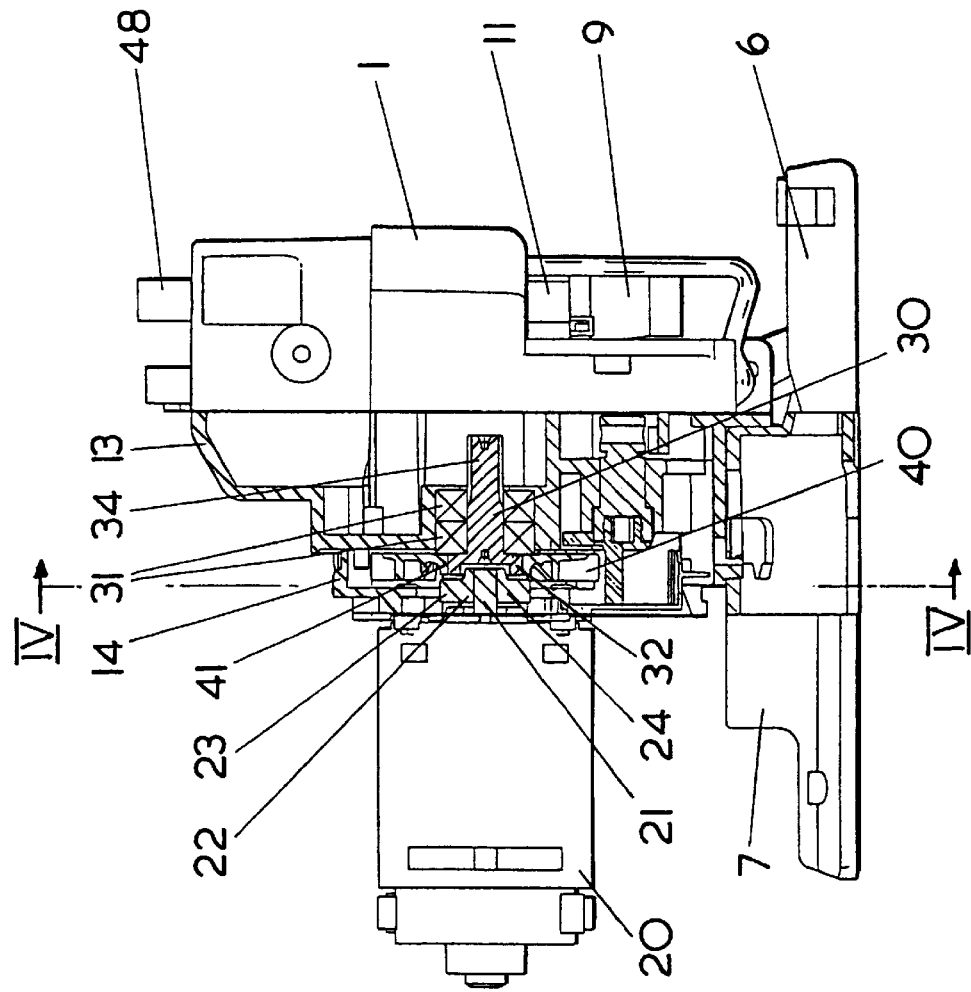
FIG. 2 is a fragmentary view, partly in section, of the jigsaw from FIG. 1, the section in the plane of projection according to FIG. 1 running through the middle of the jigsaw.

Furthermore, note that parts of the jigsaw housing 1 that is shown in FIG. 1 are not shown in the remaining Figures, which show, at least partially, inner housing parts 13 and 14. In the absence of parts of the jigsaw housing 1, the mounting for the motor housing 20 is also not shown.

The jigsaw illustrated has, as already mentioned, a jigsaw housing 1, the upper middle portion of which forms a grip region 2, beneath which there is provided a grip opening 3 into which the operating element 4 for the ON/OFF switch extends in the customary manner. A battery 15 is releasably secured to the rear end of the jigsaw housing 1. At the front upper part of the jigsaw housing 1 there is a change lever 11; this change lever is connected by way of a connection 48 to the combination of ram 10, moving back and forth in operation, and saw blade clamp 9 secured thereto, and is used in known manner to bring the saw blade clamp 9 into an opened state and a clamped state, in which a jigsaw blade 12 is retained in the clamp. The jigsaw blade 12 extends through the window, open towards the front, of a customary shoe 6, which is secured to the lower part of the jigsaw housing 1 by means of an arched portion 7. By means of an operating element, the clamped fastening of the shoe 6 can be released and by turning the shoe 6 the bearing surface thereof can be brought into an inclined position with respect to the jigsaw blade 12 and the shoe 6 can be clamped in that position again in order thus, as is common in jigsaws, to obtain an inclined cutting edge setting.

Figure 3:
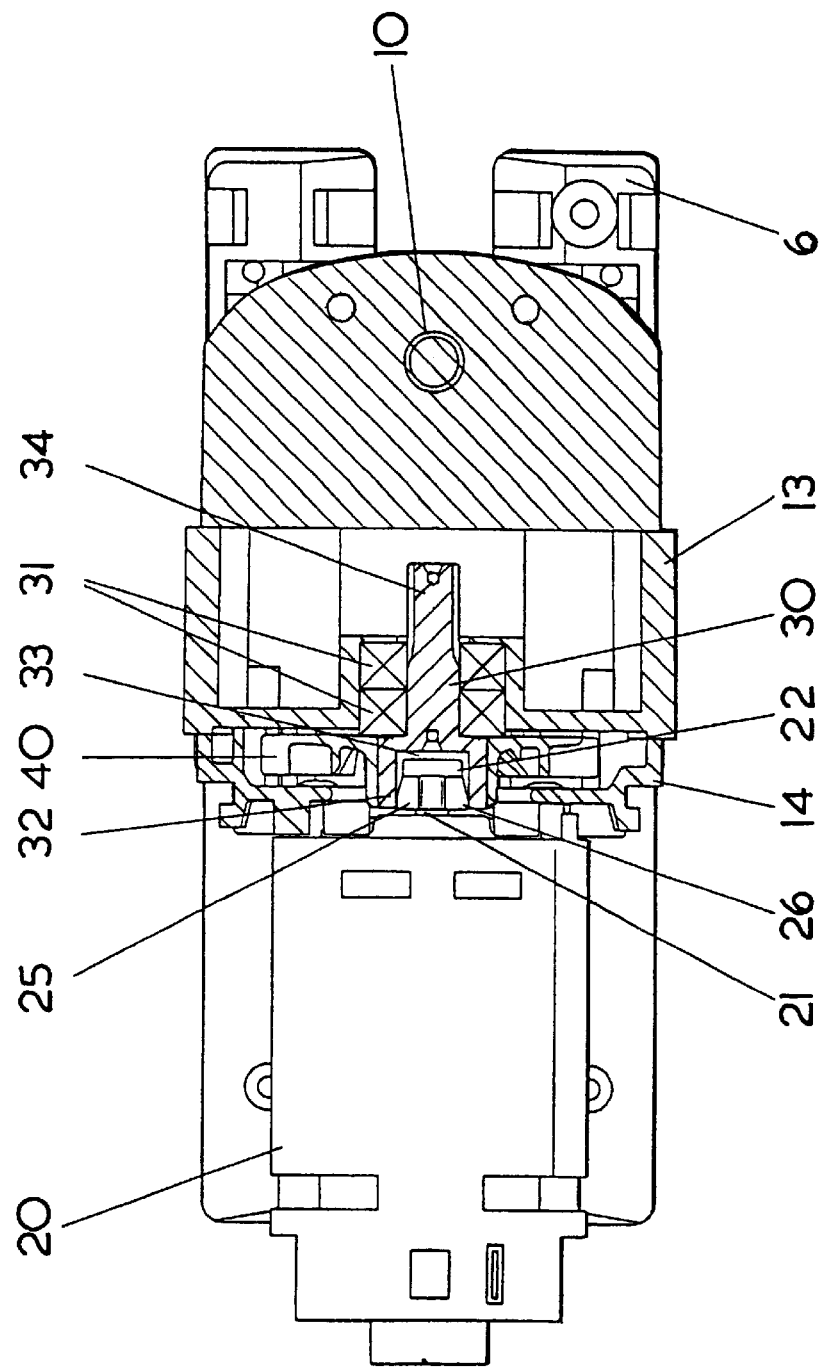
FIG. 3 is a cross sectional view taken along line III—III of FIG. 2, in which the section runs perpendicular to the plane of projection in FIG. 1 and through the middle of the countershaft and the motor of the of the jigsaw. (The armature shaft and bushing are shown in plan view.)

The jigsaw contains a motor unit schematically illustrated in FIG. 3 in simplified form. The motor unit contains in a motor housing 20, a stator 18, a rotor 16 and a rotor shaft 21 projecting at one end from the motor housing 20. In the motor unit, two bearing 17, 19 rotatably mount the rotor shaft 21 in housing 20. Such motor units are commercially available and are increasingly being used in electric tools because of their favourable price.

Figure 4:
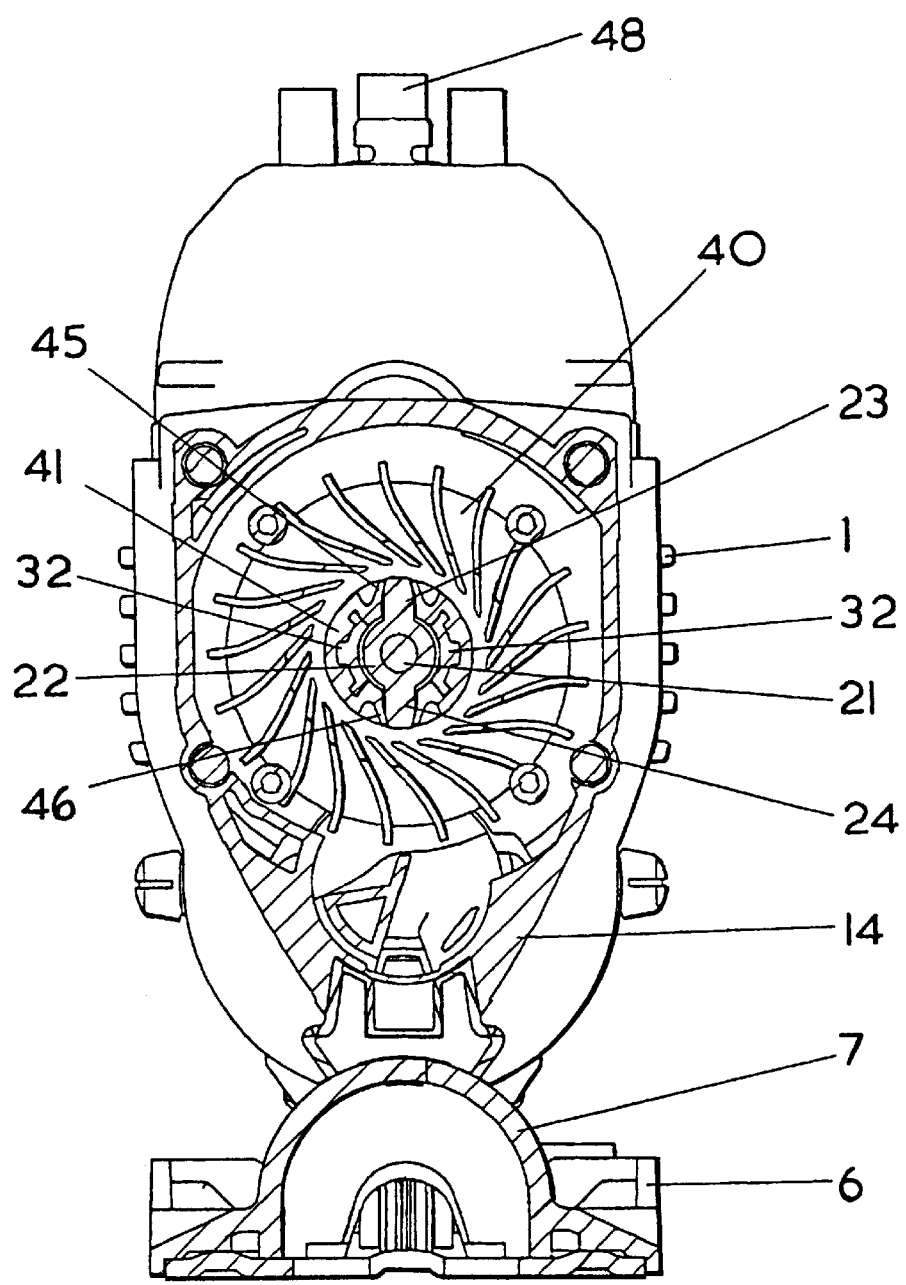
FIG. 4 shows the jigsaw according to FIGS. 1 to 3, partly as a fragmentary view and partly in section along the line IV—IV from FIG. 2.
Figure 5:
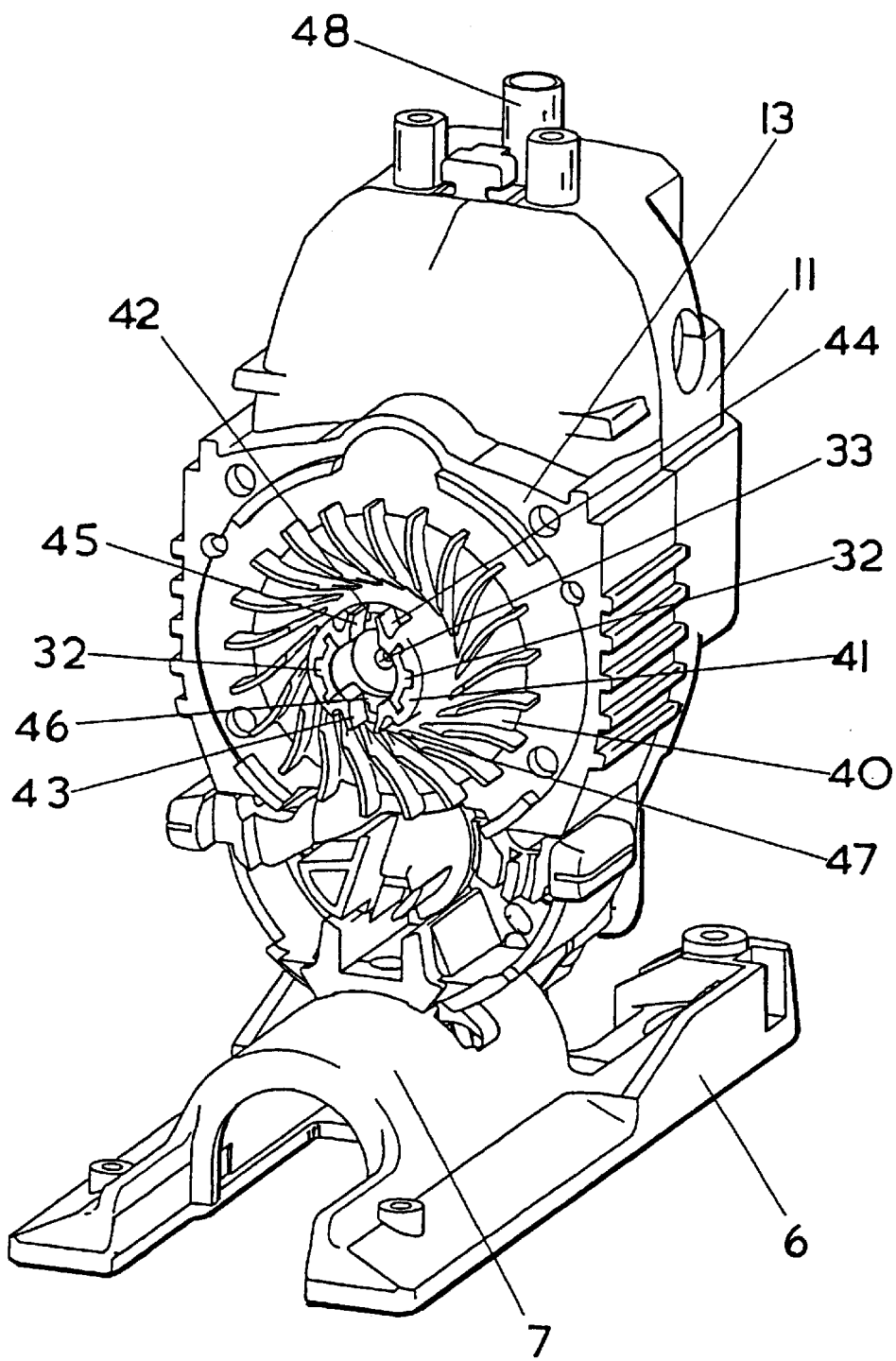
FIG. 5 is a perspective view of the part of the jigsaw shown in FIG. 4.
Figure 6:
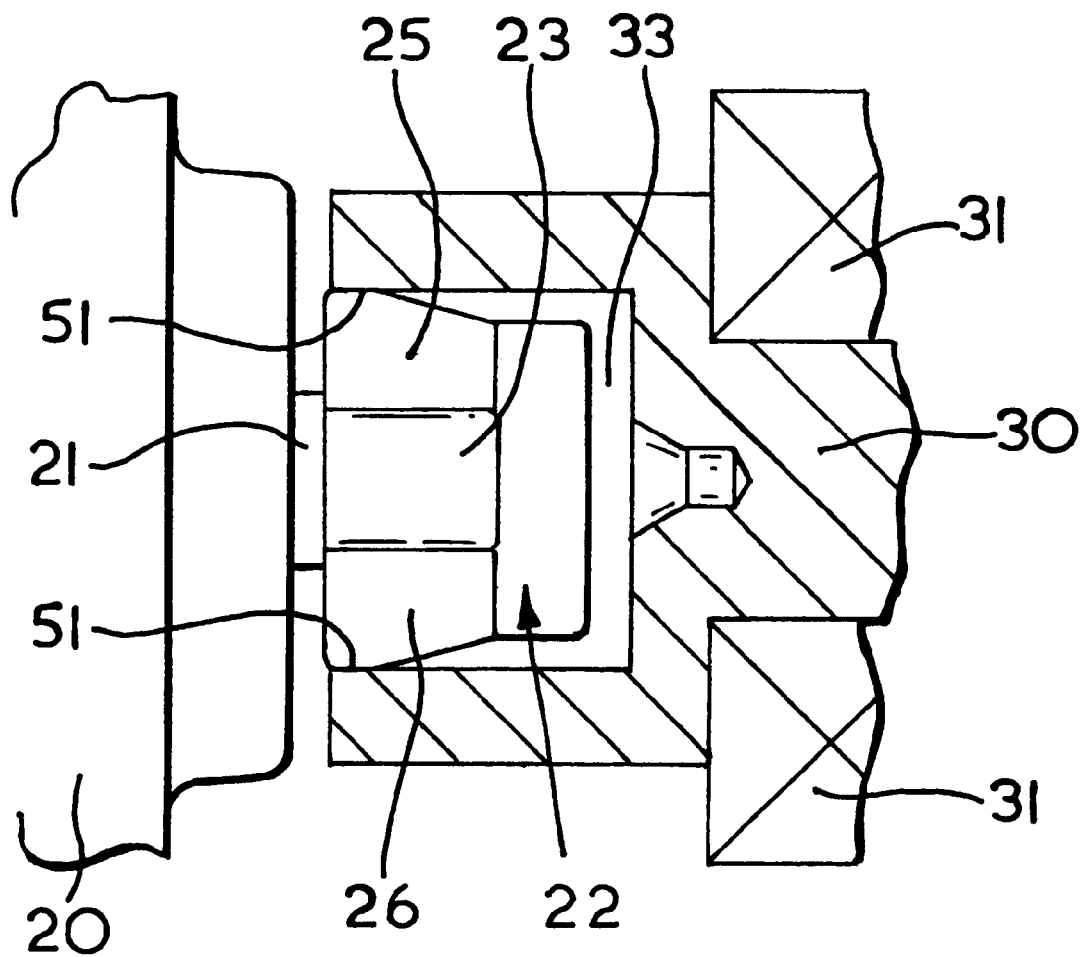
FIG. 6 is an enlargement of a portion of FIG. 3 showing the connection of the rotor shaft and the countershaft.

The motor unit is secured by means of screws, not illustrated in detail, to a location plate 14 in the form of a housing part, which is screwed to a housing section 13. Two bearings 31 lying directly adjacent to one another and in which a countershaft 30 is rotatably mounted, are fixed In the housing section 13, which forms part of the wall of the gear train housing. The countershaft 30 is aligned coaxial with the rotor shaft 21 and at its end remote from the motor unit forms a pinion 34, which, in a manner not illustrated, meshes with an input gearwheel of the jigsaw gear train. At its end closer to the motor unit, the countershaft 30 has an enlarged cross-section 32 and forms there a recess or opening 33 open to the motor unit. In this region, the outside of the countershaft 30 is in the form of a splined shaft (FIGS. 4 and 5), and the hub 41 of a plastics material fan wheel 40 is placed thereon. This fan wheel extends in a space formed between retaining plate 14 and the rear wall of housing part 13 facing the motor unit. The region 32 of the countershaft 30 has diagonally opposite indentations open towards the motor unit which continue radially outwards as openings 42, 43 (FIG. 5) of the hub 41 of the fan wheel 40. On both sides of each of the openings 42, 43 there are supporting portions 44, 45 and 46, 47 formed from the plastic material of the fan wheel and of integral construction therewith, which are resiliently deformable in the circumferential direction.

A bushing 22 is secured non-rotatably on the free end of the rotor shaft 21, and on the bushing there are formed projections 23, 24 lying diagonally opposite one another which in the mounted state engage in the openings 42, 43 in the fan wheel. The supporting portions 44, 45, and 46. 47 then abut the sides of the projections 23, 24. Component regions 25, 26 of an annular portion (FIG. 3) formed integral with the bushing 22 extend between the projections 23, 24 on both sides against the outer surface of the bushing 22, the annular portion lying in a plane perpendicular to the longitudinal axis of the rotor shaft 21 and the longitudinal axis of the countershaft 30 arranged coaxial therewith. In the mounted state, the annular portion is in line contact 51 with the inner circumferential surface of the opening 33 of the countershaft 30, whilst otherwise there is radial clearance between the outer surface of the bushing 22 and the inner circumferential surface of the opening 33.

As is readily apparent, the engagement of the projections 23 and 24 of the bushing mounted non-rotatably on the rotor shaft 21 with the openings 42, 43 in the fan wheel 40 mounted non-rotatably on the countershaft 30 produces a coupling for transfer of the rotary movement of the rotor shaft 21 to the countershaft 30. Here, rotations of the countershaft 30 and rotor shaft 21 relative to one another, for instance as a consequence of sudden loading on the countershaft 30 resulting from impact stress occurring at the jigsaw blade 12, are damped by the resiliently deformable supporting portions 44, 45 and 46, 47 abutting the projections 23, 24 laterally, so that generation of noise that is otherwise possible is considerably reduced.

As already mentioned, the rotor shaft 21 is rotatably mounted in two bearings in the motor housing 20, whilst the countershaft 30 is mounted in the bearings 31 located in the housing part 13. This three-point bearing makes it practically impossible to align rotor shaft 21 and countershaft 30 exactly coaxially with one another. Because the bushing 22 is located with radial play in the opening 33 of the countershaft 30 and because there is only line contact, via the annular portion 25, 26, between inner surface of the opening 33 and outer surface of the bushing 22, rotor shaft 21 and countershaft 30 are able to engage one another with a slight misalignment, this misalignment being accommodated by a corresponding displacement of the annular portion 25, 26 within the opening 33. Despite that, the line contact between annular portion 25, 26 and inner surface of the opening 33 is maintained, and it has unexpectedly been shown that this engagement dramatically reduces the considerable generation of noise that would otherwise occur in this coupling region.

We claim:

1. A portable power tool comprising:

a tool housing;

a motor in the tool housing;

the motor comprising a housing and rotor shaft rotatably mounted in and projecting from one end of the motor housing;

a gear train;

a chuck connected to and drivable by the gear train;

a countershaft for coupling the rotor shaft and the gear train;

a bearing for mounting the countershaft in the tool housing;

a nonrotatable, axial overlapping connection between the countershaft and the rotor shaft, the connection permitting radial play between the shafts and comprising projections on a first of the shafts;

recesses on the second of the shafts mating with the projections;

an annular portion extending over a portion of the circumference of one of the shafts; and a circumferential surface on the other of the shafts substantially in line contact with the annular portion.

2. The power tool of claim 1 wherein the projections include two diagonally opposite projections.

3. The power tool of claim 1 wherein the connection comprises (1) a coaxial opening in the countershaft and (2) a bushing is affixed to the rotor shaft and extends into the coaxial opening; and the projections and the annular portion are formed on the bushing.

4. The power tool of claim 1 wherein the recesses have resiliently deformable supporting portions abutting the projections on each side.

5. The power tool of claim 1 further comprising:

a fan wheel formed of plastic, supported on the countershaft and having a hub and the recesses formed in the hub of the fan wheel.

6. The power tool of claim 1 further comprising a pair of spaced bearings for rotatably supporting the rotor shaft in the housing.

* * * * *